US011329925B2

(12) United States Patent
Slota et al.

(10) Patent No.: US 11,329,925 B2
(45) Date of Patent: May 10, 2022

(54) TECHNOLOGIES FOR LOW-LATENCY NETWORK PACKET TRANSMISSION

(71) Applicant: Intel Corporation, Santa Clara, CA (US)

(72) Inventors: Alexander B. Slota, Santa Clara, CA (US); James A. Coleman, Mesa, AZ (US); Rajkumar Khandelwal, Chandler, AZ (US); Anil Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/146,105

(22) Filed: Sep. 28, 2018

(65) Prior Publication Data

US 2019/0044870 A1 Feb. 7, 2019

(51) Int. Cl.
*H04L 12/841* (2013.01)
*H04L 47/283* (2022.01)
*H04L 47/30* (2022.01)
*H04W 4/70* (2018.01)
*H04L 43/087* (2022.01)
*H04W 28/06* (2009.01)
*H04L 45/00* (2022.01)

(52) U.S. Cl.
CPC .......... *H04L 47/283* (2013.01); *H04L 43/087* (2013.01); *H04L 45/38* (2013.01); *H04L 47/30* (2013.01); *H04W 4/70* (2018.02); *H04W 28/06* (2013.01)

(58) Field of Classification Search
None
See application file for complete search history.

(56) References Cited

U.S. PATENT DOCUMENTS

| | | | | |
|---|---|---|---|---|
| 2003/0112817 A1* | 6/2003 | Woo | ........................ | H04L 47/10 370/413 |
| 2003/0130833 A1* | 7/2003 | Brownell | .......... | H04L 29/12009 703/23 |
| 2003/0163620 A1* | 8/2003 | Minami | ................. | G06F 3/0679 710/62 |
| 2007/0011358 A1* | 1/2007 | Wiegert | ................... | H04L 47/10 709/250 |
| 2013/0159568 A1* | 6/2013 | Shahar | ................... | H04L 49/901 710/54 |
| 2016/0182373 A1* | 6/2016 | Wang | ................... | H04L 45/7453 370/392 |
| 2017/0163575 A1* | 6/2017 | Wang | ................... | H04L 49/9094 |

* cited by examiner

*Primary Examiner* — James P Duffy
(74) *Attorney, Agent, or Firm* — Hanley, Flight & Zimmerman, LLC (57) ABSTRACT

Technologies for managing low-latency network packet transmissions include an internet-of-things (IoT) device, or other networked device, depending on the embodiment, configured to determine a transmit mode of a network packet to be transmitted from the IoT device, wherein the transmit mode comprises one of a legacy network packet transmission mode or an immediate transmission mode. The IoT device includes a processor configured to write data of the network packet directly to a transmit buffer register of a network interface controller (NIC) of the IoT device subsequent to a determination that the transmit mode corresponds to the immediate transmission mode. Other embodiments are described herein.

21 Claims, 6 Drawing Sheets

TECHNOLOGIES FOR LOW-LATENCY NETWORK PACKET TRANSMISSION

BACKGROUND

Many types of devices, such as sensors, wearables, vehicles, appliances, industrial equipment, and other things, are gaining computing resources and network capability. Sometimes described as the Internet of Things (IoT), modern computing systems may include cloud-based servers, network infrastructure, and connected edge devices that all work together to perform networked application functions. In certain applications, one IoT connected device may need to communicate with other IoT connected devices, a gateway, and/or a remote server in the cloud. Oftentimes, IoT devices are deployed in time-sensitive environments, such as in industrial IoT deployments, wherein latency can potentially cripple certain applications.

Presently, cycle times are generally bounded by transmit latency, compute time, and receive latency. Compute cycle times are continually shrinking, bringing to focus a need to improve deterministic compute required by industrial, automotive, and other embedded applications. The capabilities found in the present packet transmission mode (e.g., variable packet size and buffer relocation) allow for supporting flexible packet sizes and provide a generally robust solution, despite ever shrinking cycle times. However, the present packet transmission mode techniques typically induce discernable and negatively impactful amounts of latency and jitter.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
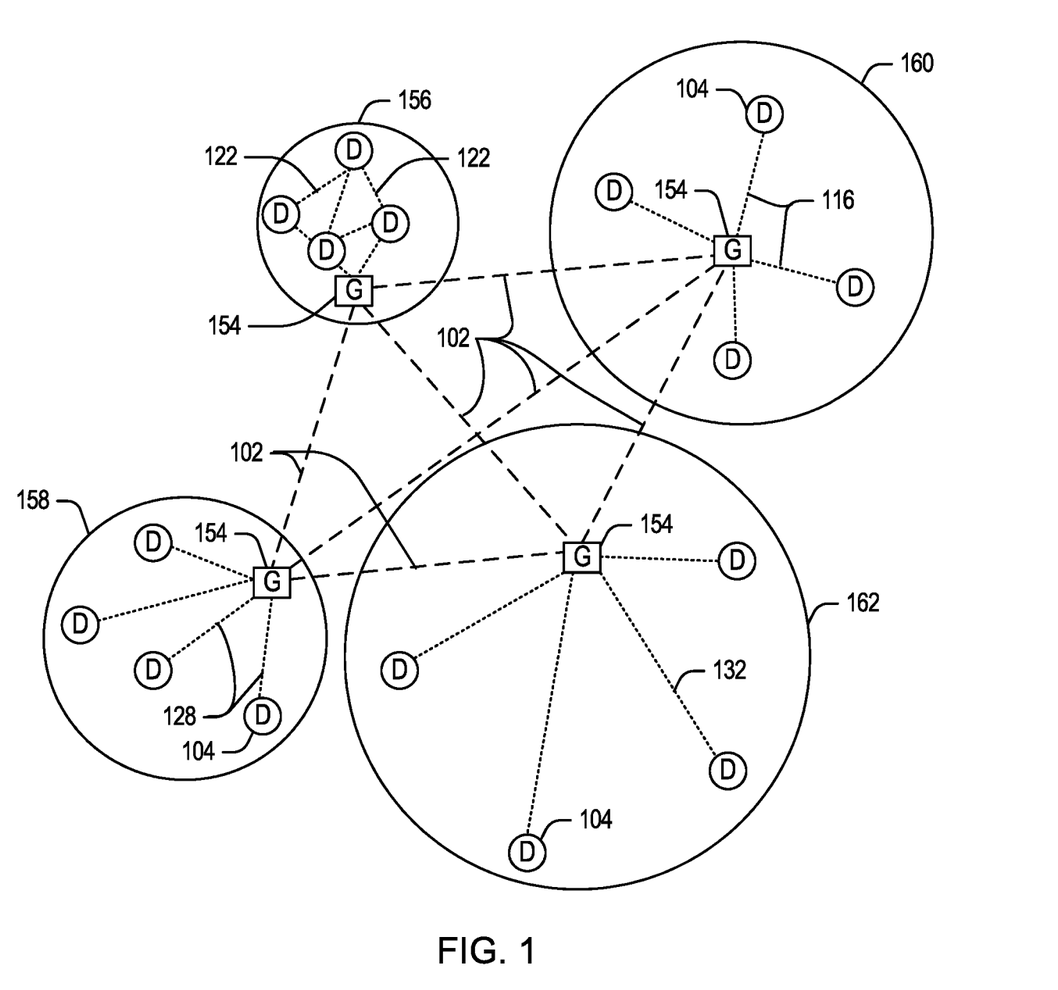
FIG. 1 is a simplified domain topology of at least one embodiment for respective internet-of-things (IoT) networks coupled through links to respective gateways.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Oftentimes, IoT devices are deployed in time-sensitive environments, such as in industrial IoT deployments, in which latency can potentially cripple or otherwise impede the flow of certain applications.

As such, it should be appreciated that the speed at which the IoT device can perform computations and the speed of internal/external communications of the IoT device are oftentimes critical factors of an IoT based network architecture. Presently, compute cycle times are often bounded by transmit latency, compute time, and receive latency. However, compute cycle times are continually shrinking as the demand on compute continues to increase, bringing to focus a need to improve deterministic compute required by industrial, automotive, and other embedded applications. While the capabilities found in the present packet transmission mode (e.g., variable packet size and buffer relocation) allow for supporting flexible packet sizes and provide a generally robust solution, despite ever shrinking cycle times, the present packet transmission mode techniques also typically induce discernable and negatively impactful amounts of latency and jitter.

In use, as will be described in further detail below, the IoT devices described herein eliminates the pre-fetch flow of transmitting a network packet (e.g., an Ethernet frame) from a processor to a network interface controller (NIC) (e.g., post-generation, post-processing, etc.) for network packets that meet a predetermined criteria. To do so, the IoT devices are configured to determine whether the network packet meets the predetermined criteria and, if so, perform an immediate transmission mode to reduce the legacy network packet transmission mode into a single memory mapped I/O (MMIO) write operation. As such, the transmission latency is reduced to the duration of time that an MMIO write operation traversing the internal chip fabric and the time taken by the NIC to actually transmit the packet. Accordingly, network packet transmission latency and jigger can be improved. With the shrinking cycle times noted previously, the reduced time to perform the operation can give compute cycles back to the processor, which can, in turn, improve determinism and effective processor bandwidth.

Due to their oftentimes smaller form factors, IoT devices are usually, IoT devices are limited in memory, size, or functionality, allowing larger numbers to be deployed for a similar cost to smaller numbers of larger devices. However, depending on the embodiment, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like. Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
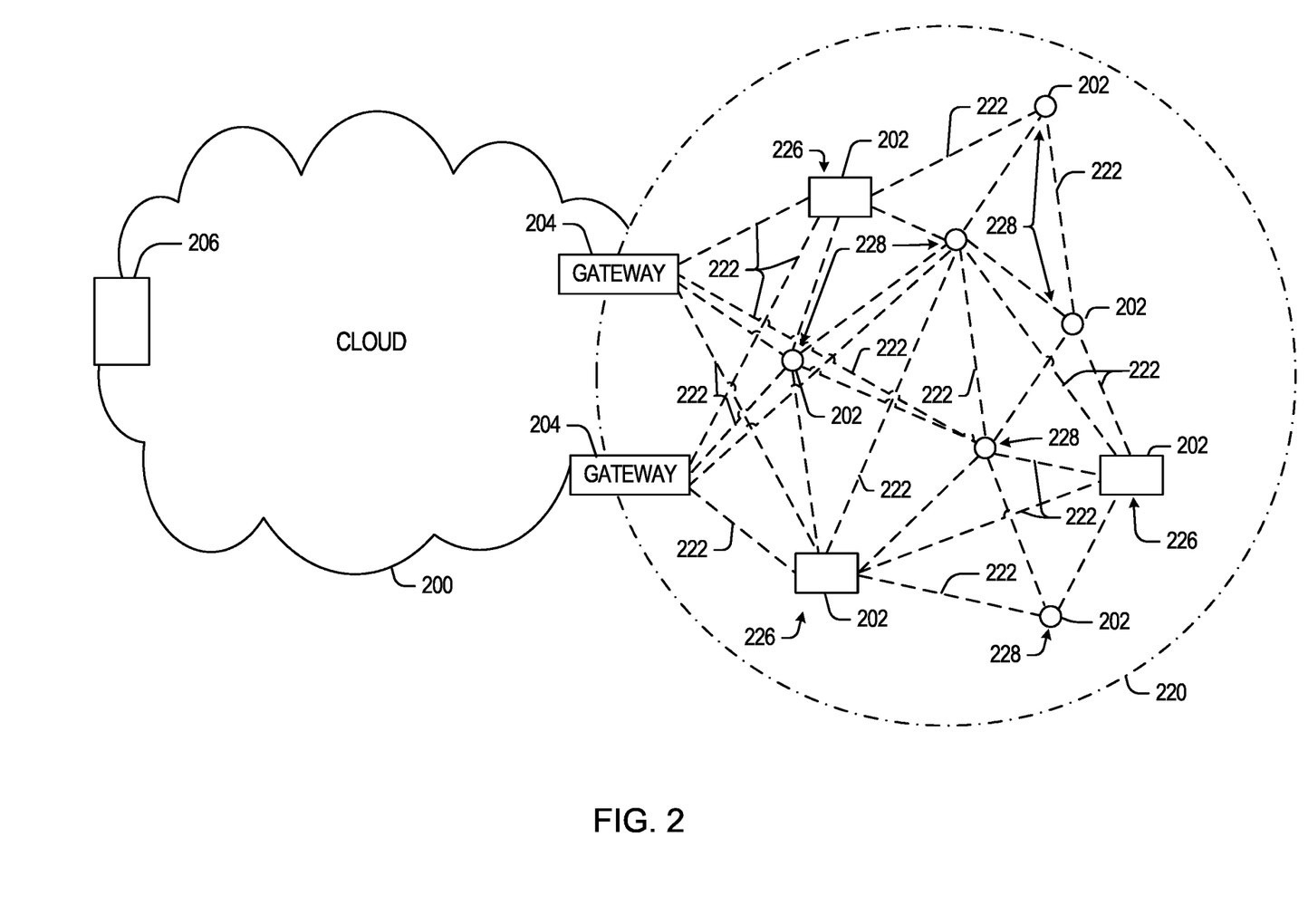
FIG. 2 is a simplified cloud computing network in communication with a mesh network of IoT devices operating as a fog device at the edge of the cloud computing network.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 3 and 12.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 3:
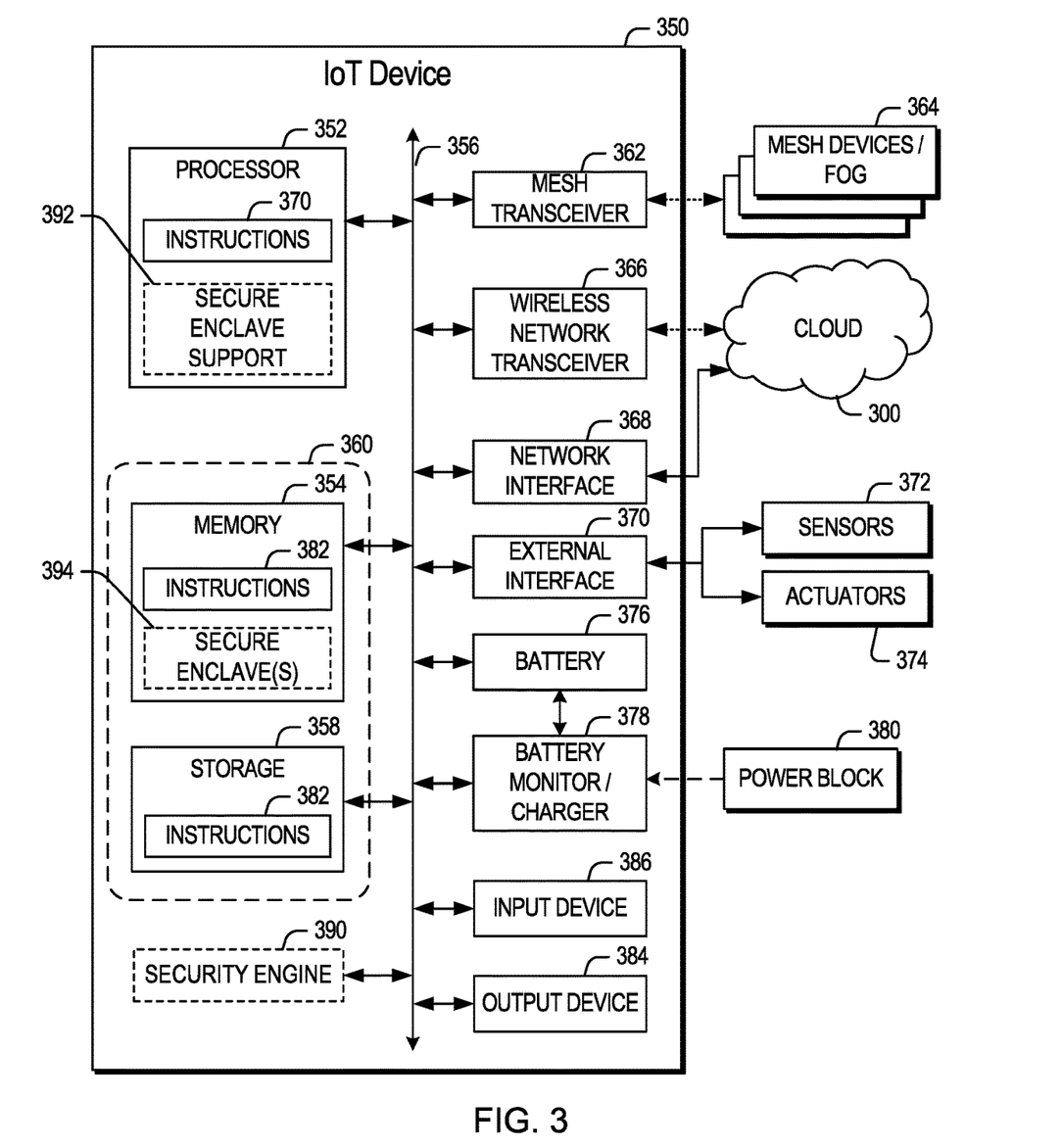
FIG. 3 is a simplified block diagram of at least one embodiment of an IoT processing system architecture upon which any one or more of the techniques (e.g., operations, processes, methods, and methodologies) discussed herein may be performed.

Referring now to FIG. 3, an illustrative block diagram is shown of components that may be present in an IoT device 350 for implementing the techniques described herein. The IoT device 350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 350, or as components otherwise incorporated within a chassis of a larger system. Additionally, the block diagram of FIG. 3 is intended to depict a high-level view of components of the IoT device 350. However, some of the components shown may be omitted, additional components may be present, and different arrangement of the components shown may occur in other implementations.

The IoT device 350 may include a processor 352, which may be a microprocessor, a multi-core processor, a multi-threaded processor, an ultra-low voltage processor, an embedded processor, or other known processing element. The processor 352 may be a part of a system on a chip (SoC) in which the processor 352 and other components are formed into a single integrated circuit, or a single package, such as the Edison™ or Galileo™ SoC boards from Intel. As an example, the processor 352 may include an Intel® Architecture Core™ based processor, such as a Quark™, an Atom™, an i3, an i5, an i7,or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 352 may communicate with a system memory 354 over an interconnect 356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 358 may also couple to the processor 352 via the interconnect 356. In an example the storage 358 may be implemented via a solid state disk drive (SSDD). Other devices that may be used for the storage 358 include flash memory cards, such as SD cards, microSD cards, xD picture cards, and the like, and USB flash drives. In low power implementations, the storage 358 may be on-die memory or registers associated with the processor 352. However, in some examples, the storage 358 may be implemented using a micro hard disk drive (HDD). Further, any number of new technologies may be used for the storage 358 in addition to, or instead of, the technologies described, such resistance change memories, phase change memories, holographic memories, or chemical memories, among others.

The components may communicate over the interconnect 356. The interconnect 356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 356 may be a proprietary bus, for example, used in a SoC based system. Other bus systems may be included, such as an I2C interface, an SPI interface, point to point interfaces, and a power bus, among others.

The interconnect 356 may couple the processor 352 to a mesh transceiver 362, for communications with other mesh devices 364. The mesh transceiver 362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 362 may communicate using multiple standards or radios for communications at different range. For example, the IoT device 350 may communicate with close devices, e.g., within about 10 meters, using a local transceiver based on BLE, or another low power radio, to save power. More distant mesh devices 364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 366 may be included to communicate with devices or services in the cloud 300 via local or wide area network protocols. The wireless network transceiver 366 may be a LPWA transceiver that follows the IEEE 802.15.4, or IEEE 802.15.4g standards, among others. The IoT device 350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 362 and wireless network transceiver 366, as described herein. For example, the radio transceivers 362 and 366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 362 and 366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The network interface controller (NIC) 368 may be embodied as any type of firmware, hardware, software, or any combination thereof that facilitates communication to the cloud 300 or to other devices, such as the mesh devices 364. For example, the NIC 368 may be embodied as one or more add-in-boards, daughtercards, network interface cards, controller chips, chipsets, or other devices that may be used by the IoT device 350 to connect with another device. While not illustratively shown, it should be appreciated that the NIC 368 typically includes one or more physical ports (e.g., for facilitating the ingress and egress of network traffic) and one or more devices for performing/offloading certain network functionality and/or processing functions (e.g., a DMA engine).

In some embodiments, the NIC 368 may be embodied as part of a SoC that includes one or more processors, or included on a multichip package that also contains one or more processors. Additionally or alternatively, in some embodiments, the NIC 368 may include one or more processing cores (not shown) local to the NIC 368. In such embodiments, the processing core(s) may be capable of performing one or more of the functions described herein. In some embodiments, the NIC 368 may additionally include a local memory (not shown). In such embodiments, the local memory of the NIC 368 may be integrated into one or more components of the IoT device 350 at the board level, socket level, chip level, and/or other levels.

In some embodiments, the NIC 368 may facilitate a wired communication enabling connection, such as an Ethernet connection, while in other embodiments the wired communication may be based on other types of data transmission enabling networks, such as Controller Area Network (CAN), Local Interconnect Network (LIN), DeviceNet, ControlNet, Data Highway+, PROFIBUS, or PROFINET, among many others. In other embodiments, the IoT device 350 may include one or more additional NICs 368, which may be included to allow connection to additional and/or alternative network. In an illustrative example, the IoT device 350 may include one NIC 368 to provide communications to the cloud over Ethernet, and another NIC 368 to provide communications to other devices over another type of network.

The interconnect 356 may couple the processor 352 to an external interface 370 that is used to connect external devices or subsystems. The external devices may include sensors 372, such as accelerometers, level sensors, flow sensors, optical light sensors, camera sensors, temperature sensors, global positioning system (GPS) sensors, pressure sensors, barometric pressure sensors, and the like. The external interface 370 further may be used to connect the IoT device 350 to actuators 374, such as power switches, valve actuators, an audible sound generator, a visual warning device, and the like.

In some optional examples, various input/output (I/O) devices may be present within, or connected to, the IoT device 350. For example, a display or other output device 384 may be included to show information, such as sensor readings or actuator position. An input device 386, such as a touch screen or keypad may be included to accept input. An output device 384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 350.

A battery 376 may power the IoT device 350, although in examples in which the IoT device 350 is mounted in a fixed location, it may have a power supply coupled to an electrical grid. The battery 376 may be a lithium ion battery, or a metal-air battery, such as a zinc-air battery, an aluminum-air battery, a lithium-air battery, and the like.

A battery monitor/charger 378 may be included in the IoT device 350 to track the state of charge (SoCh) of the battery 376. The battery monitor/charger 378 may be used to monitor other parameters of the battery 376 to provide failure predictions, such as the state of health (SoH) and the state of function (SoF) of the battery 376. The battery monitor/charger 378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 378 may communicate the information on the battery 376 to the processor 352 over the interconnect 356. The battery monitor/charger 378 may also include an analog-to-digital (ADC) convertor that allows the processor 352 to directly monitor the voltage of the battery 376 or the current flow from the battery 376. The battery parameters may be used to determine actions that the IoT device 350 may perform, such as transmission frequency, mesh network operation, sensing frequency, and the like.

A power block 380, or other power supply coupled to a grid, may be coupled with the battery monitor/charger 378 to charge the battery 376. In some examples, the power block 380 may be replaced with a wireless power receiver to obtain the power wirelessly, for example, through a loop antenna in the IoT device 350. A wireless battery charging circuit, such as an LTC4020 chip from Linear Technologies of Milpitas, Calif., among others, may be included in the battery monitor/charger 378. The specific charging circuits chosen depend on the size of the battery 376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 358 may include instructions 382 in the form of software, firmware, or hardware commands to implement the techniques described herein. Although such instructions 382 are shown as code blocks included in the memory 354 and the storage 358, it may be understood that any of the code blocks may be replaced with hardwired circuits, for example, built into an application specific integrated circuit (ASIC).

In an example, the instructions 382 provided via the memory 354, the storage 358, or the processor 352 may be embodied as a non-transitory, machine readable medium 360 including code to direct the processor 352 to perform electronic operations in the IoT device 350. The processor 352 may access the non-transitory, machine readable medium 360 over the interconnect 356. The illustrative processor 352 includes a secure enclave support 392. The secure enclave support 392 allows the processor 352 to establish a trusted execution environment (TEE) known as a secure enclave (see, e.g., the secure enclave 394), in which executing code may be measured, verified, and/or otherwise determined to be authentic. Additionally, code and data included in the secure enclave may be encrypted or otherwise protected from being accessed by code executing outside of the secure enclave 394. For example, code and data included in the secure enclave may be protected by hardware protection mechanisms of the processor 352 while being executed or while being stored in certain protected cache memory (not shown) of the processor 352. The code and data included in the secure enclave may be encrypted when stored in a shared cache or the system memory 354. The secure enclave support 392 may be embodied as a set of processor instruction extensions that allows the processor 352 to establish one or more secure enclaves in the system memory 354. For example, the secure enclave support 392 may be embodied as Intel® Software Guard Extensions (SGX) technology. In some embodiments, the system memory 354 may be used to store the contents of one or more secure enclaves. When stored by the system memory 354, the contents of the secure enclave may be encrypted to prevent unauthorized access.

The non-transitory, machine readable medium 360 may be embodied by devices described for the storage 358 of FIG. 3 or may include specific storage units such as optical disks, flash drives, or any number of other hardware devices. Additionally, the non-transitory, machine readable medium 360 may include instructions to direct the processor 352 to perform a specific sequence or flow of actions, for example, as described with respect to the flowchart(s) and block diagram(s) of operations and functionality depicted above. In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions.

A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

The illustrative IoT device 350 additionally includes include a security engine 390, which may be embodied as any hardware component(s) or circuitry capable of providing security-related services to the IoT device 350. In particular, the security engine 390 may include a microprocessor, microcontroller, or other embedded controller capable of executing firmware and/or other code independently and securely from the processor 352. Thus, the security engine 390 may be used to establish a trusted execution environment separate from code executed by the processor 352. The security engine 390 may communicate with the processor 352 and/or other components of the IoT device 350 over a dedicated bus, such as a host embedded controller interface (HECI).

The security engine 390 may also provide remote configuration, control, or management of the IoT device 350. In the illustrative embodiment, the security engine 390 is embodied as a converged security and manageability engine (CSME) incorporated in a SoC of the IoT device 350. In some embodiments, the security engine 390 may be embodied as a manageability engine, an out-of-band processor, a Trusted Platform Module (TPM), or other security engine device or collection of devices. Further, in some embodiments, the security engine 390 is also capable of communicating using the interconnect 356 or a dedicated communication circuit independently of the state of the IoT device 350 (e.g., independently of the state of the processor 352), also known as "out-of-band" communication.

Figure 4:
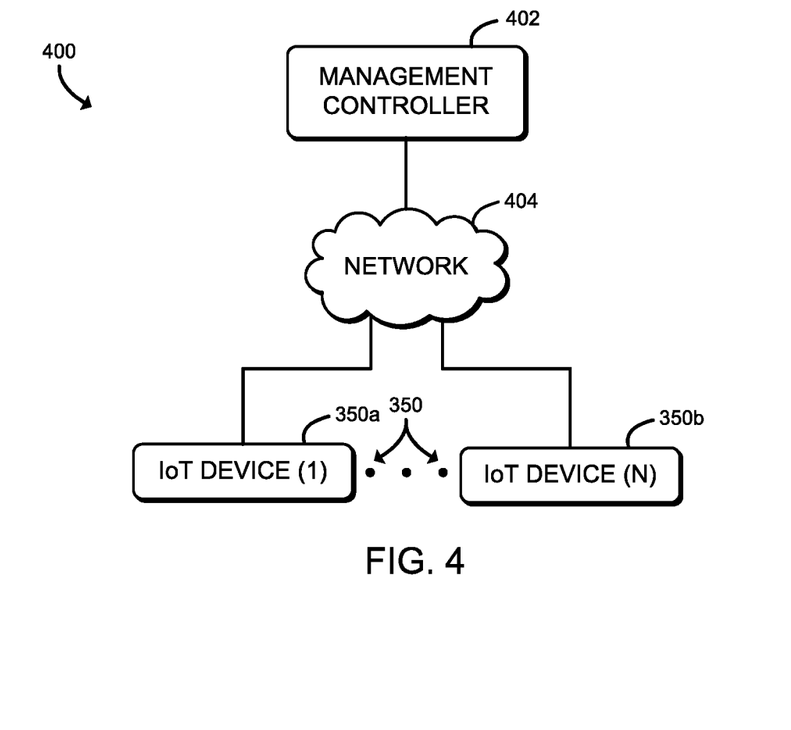
FIG. 4 is a simplified block diagram of at least one embodiment of a system for managing low-latency network packet transmissions.

Referring now to FIG. 4, in an illustrative embodiment, a system 400 for managing low-latency network packet transmission is shown that includes a management controller 402 and multiple IoT devices 350. The illustrative IoT devices 350 include a first IoT device 350 designated as IoT device (1) 350a and a second IoT device 350 designated as IoT device (N) 350b (wherein the IoT device (N) 350b represents the "Nth" IoT device 350 and "N" is a positive integer). Each of the IoT devices 350a and 350b may be communicatively coupled at a given point in time to each other via a network 404 and/or a management controller 402 via the network or other communication medium.

As described previously, each of the IoT devices 350 are configured to deterministically reduce internal hardware communication latency and jitter when transmitting a network packet from a processor (e.g., the processor 352 of FIG. 3) of an IoT device 350 to a NIC (e.g., the NIC 368 of FIG. 3) of the IoT device 350. To do so, the IoT devices 350 are configured to determine a network packet transmission mode based on a predetermined criteria and a corresponding characteristic of the network packet. The corresponding characteristic may include any information associated with the network packet that is usable to determine the network packet transmission mode, such as a size of the network packet, a workload type associated with the network packet, a flow associated with the network packet, a source and/or destination identifying characteristic of the network packet (e.g., an Internet Protocol (IP) address, a media access control (MAC) address, a port, etc.), an indication retrieved from a header of the network packet, etc. Depending on the embodiment, the predetermined criteria may be programmatically assigned to an IoT device (e.g., in firmware) and/or received from the management controller 402 (e.g., via a software implementation).

The management controller 402 may be embodied as any type of computation or compute device capable of performing the functions described herein, including, without limitation, a computer, a server (e.g., stand-alone, rack-mounted, blade, etc.), a network appliance (e.g., physical or virtual), a web appliance, a distributed computing system, a processor-based system, and/or a multiprocessor system. It should be appreciated that, while not illustratively shown, the management controller 402 may include one or more components for performing the functions described herein, such as one or more processors, memory, NIC, data storage, etc.

The network 442 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a LAN, a WAN, a global network (e.g., the Internet), or any combination thereof. It should be appreciated that, in such embodiments, the network 442 may serve as a centralized network and, in some embodiments, may be communicatively coupled to another network (e.g., the Internet). Accordingly, the network 442 may include a variety of other virtual and/or physical network computing devices (e.g., routers, switches, network hubs, servers, storage devices, compute devices, etc.), as needed to facilitate communication across devices, which are not shown to preserve clarity of the description.

It should be appreciate that, while not illustratively shown, the IoT devices 350a and 350b may be communicatively coupled over an IoT network, which may be embodied as, or otherwise include, a wired or wireless LAN, a wired or wireless WAN, a low power wide area network (LPWAN) such as LoRaWAN™, SIGFOX, etc., a controller-area network, a cellular network, and/or a publicly-accessible, global network such as the Internet. As such, the IoT network may include any number of additional devices, such as additional compute and/or storage devices, access points, routers, switches, and hubs as may be necessary to facilitate the transmission of communications across the IoT network.

Figure 5:
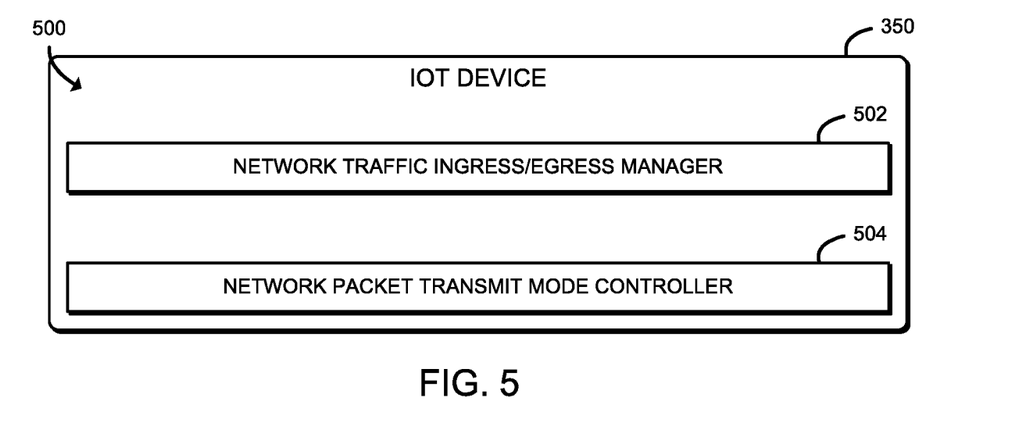
FIG. 5 is a simplified block diagram of at least one embodiment of an environment of at least one of the IoT devices of FIGS. 1-4.

Referring now to FIG. 5, in use, an illustrative one of the IoT devices 350 establishes an illustrative environment 500 during operation to manage low-latency network packet transmission. The illustrative environment 500 includes a network traffic ingress/egress manager 502 and a network packet transmit mode controller 504. The various components of the environment 500 may be embodied as hardware, firmware, software, or a combination thereof. As such, in some embodiments, one or more of the components of the environment 500 may be embodied as circuitry or collection of electrical devices (e.g., network traffic ingress/egress management circuitry 502, network packet transmit mode controller circuitry 504, etc.).

It should be appreciated that one or more functions described herein as being performed by the network traffic ingress/egress management circuitry 502 and/or the network packet transmit mode controller circuitry 504 may be performed, at least in part, by one or more other components of the IoT device 350, such as the processor 352, the mesh transceiver 362, the network transceiver 366, the NIC 368, an ASIC, a programmable circuit such as an FPGA, and/or other components of the IoT device 350. It should be further appreciated that associated instructions may be stored in the memory 354, the storage 358, and/or other data storage location, which may be executed by the processor 352 and/or other computational processor of the IoT device 350.

Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by the processor 352, the mesh transceiver 362, the network transceiver 366, the NIC 368 and/or other software/hardware components of the IoT device 350. It should be appreciated that the IoT device 350 may include other components, sub-components, modules, sub-modules, logic, sub-logic, and/or devices commonly found in a computing device (e.g., device drivers, interfaces, etc.), which are not illustrated in FIG. 5 for clarity of the description.

The network traffic ingress/egress manager 502, which may be embodied as hardware, firmware, software, virtualized hardware, emulated architecture, and/or a combination thereof as discussed above, is configured to receive inbound and route/transmit outbound network traffic. To do so, the network traffic ingress/egress manager 502 is configured to facilitate inbound/outbound network communications (e.g., network traffic, network packets, network flows, etc.) to and from the IoT device 350. For example, the network traffic ingress/egress manager 502 is configured to manage (e.g., create, modify, delete, etc.) connections to physical and virtual network ports (i.e., virtual network interfaces) of the IoT device 350, as well as the ingress/egress buffers/queues associated therewith.

The network packet transmit mode controller 504, which may be embodied as hardware, firmware, software, virtualized hardware, emulated architecture, and/or a combination thereof as discussed above, is configured to reduce the hardware latency and jitter when transmitting certain network packets from a processor (e.g., the processor 352 of FIG. 3) to a NIC (e.g., the NIC 368 of FIG. 3). To do so, the network packet transmit mode controller 504 is configured to identify one or more characteristic(s) of a network packet that is ready for transmission (e.g., subsequent to having been generated or processed). As described previously, the one or more network packet characteristics may include any information associated with the network packet that are usable to compare against one or more predetermined criterion to determine a network packet transmission mode for the network packet. As also described previously, the one or more network packet characteristics may include, but are not limited to, one or more of a size of the network packet, a workload type associated with the network packet, a flow associated with the network packet, a source and/or destination identifying characteristic (e.g., an IP address, a MAC address, a port, etc.) of the network packet, an indication retrieved from a header of the network packet, etc.

The network packet transmit mode controller 504 is further configured to initiate a legacy network packet transmission mode or an immediate transmission mode based on whether the one or more identified characteristic meets the one or more predetermined criterion. In an illustrative example in which the network packet transmit mode controller 504 has determined that the network packet is to be transmitted using the legacy network packet transmission mode, the processor 352 is configured to perform a write operation to initiate transmission of the network packet to the NIC 368, such as by transmitting an MMIO write operation command to the NIC 368. The NIC 368 is configured to respond by initiating a read operation (e.g., a Peripheral Component Interconnect Express (PCIe) read command) to read a descriptor associated with the network packet (e.g., to retrieve information, such as a pointer to memory, that is usable to read data of the network packet previously stored at a location in memory of the IoTt device 350). It should be appreciated that the amount of time that has elapsed between having received the write operation initiation command and responding with the descriptor read request command is effectively latency/jitter that has been introduced as a byproduct of using the legacy network packet transmission mode.

Upon having received the descriptor read request command, the processor 352 is configured to return a descriptor read completion message that includes the information read from the descriptor associated with the network packet. It should be appreciated that the elapsed time between having transmitted the descriptor read request command and having received the descriptor read completion message represents additional latency/jitter associated with use of the legacy network packet transmission mode. The NIC 368 is configured to transmit a data read command (e.g., a PCIe read command) to the processor 352 that is usable to read the data of the network packet. Upon having completed the data read operation, the NIC 368 is configured to return a data read completion message. It should be further appreciated that the time between issuing commands and receiving messages at the NIC 368 represent additional latency/jitter associated with using the legacy network packet transmission mode.

In another illustrative embodiment in which the network packet transmit mode controller 504 has determined the network packet is to be transmitted using the immediate transmission mode, the processor 352 is configured to write the network packet to be transmitted directly to a transmit buffer register of the NIC 368, such that the data can be transmitted on the wire (e.g., a wired or wireless interconnect) thereafter to a target destination. As described previously, the immediate transmission mode reduces packet transmission latency, jitter, and effectively gives more time back to the processor 352, thereby increasing effective compute bandwidth and increasing deterministic performance of the IoT device 350 relative to the legacy network packet transmission mode. It should be appreciated that removing the latencies associated with using the legacy network packet transmission mode can allow for low latency and low jitter transmission of high priority packets.

Figure 6:
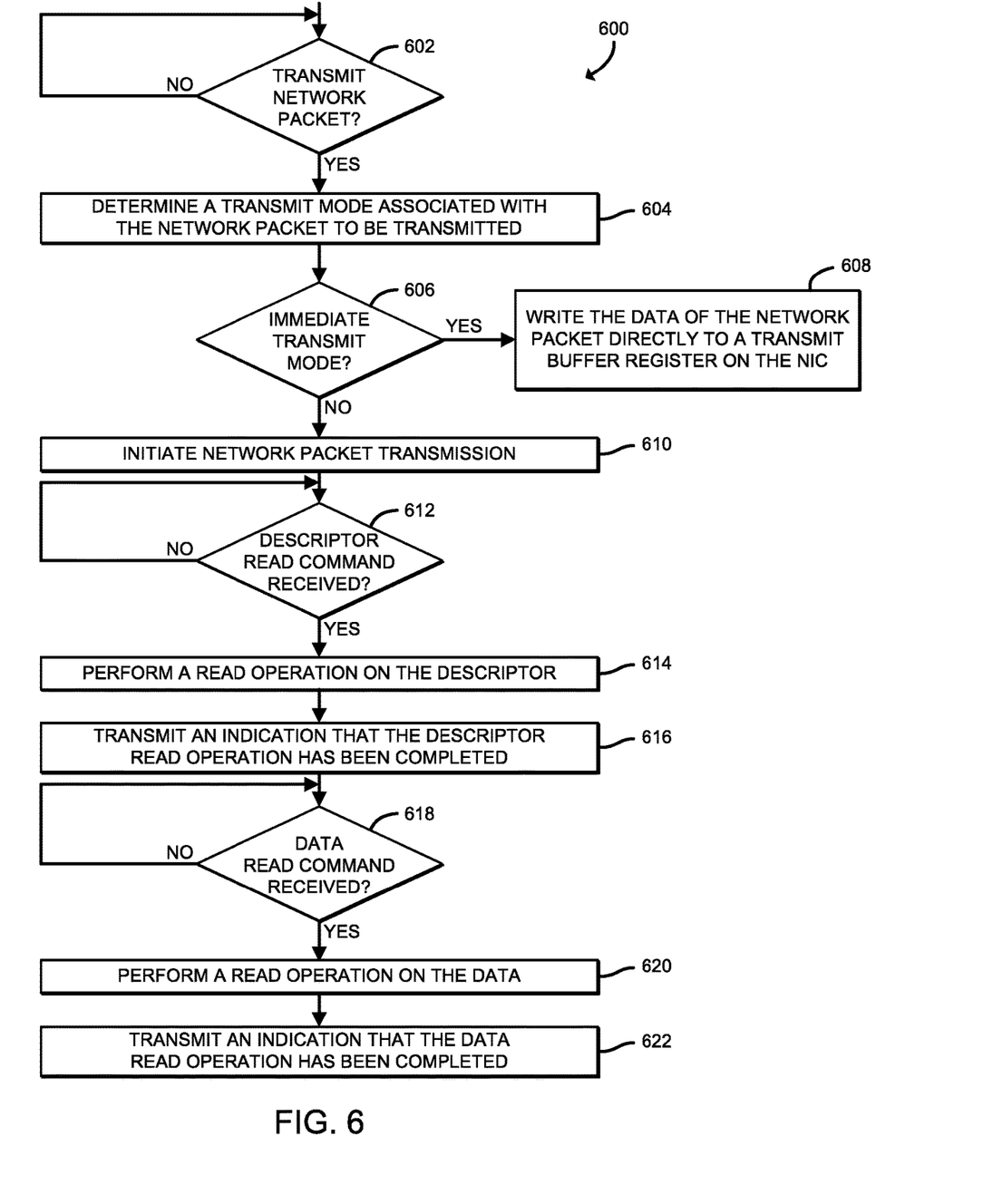
FIG. 6 is a simplified flow diagram of at least one embodiment of a method for managing low-latency network packet transmissions that may be executed by at least one of the IoT device of FIGS. 1-4.

Referring now to FIG. 6, a method 600 for managing low-latency network packet transmission is shown which may be executed by an IoT device (e.g., the IoT device 350). The method 600 begins in block 602, in which the IoT device 350, or more particularly a processor (e.g., the processor 352) of the IoT device 350, determines whether to transmit a network packet to a NIC (e.g., the NIC 368 of FIG. 3) of the IoT device 350. If so, the method 600 advances to block 604, in which the IoT device 350 determines a transmit mode associated the network packet to be transmitted. As described previously, the transmit mode may be one of an immediate transmit mode or a legacy network packet transmission mode. As also described previously, the IoT device 350 is configured to determine the transmit mode based on one or more characteristics of the network packet relative to a corresponding one or more predetermined criterion.

In block 606, the IoT device 350 determines whether the determined transmit mode corresponds to the immediate transmit mode. If so, the method 600 branches to block 608, in which the processor 352 writes the data of network packet directly to a transmit buffer register on the NIC 368, such that the data may then be placed on the wire by the NIC 368. Otherwise, if the IoT device 350 determines that the transmit mode does not correspond to the immediate transmit mode (i.e., the transmit mode corresponds to the legacy network packet transmission mode), the method 600 branches to block 610. In block 610, the processor 352 initiates network packet transmission by transmitting an indication of such to the NIC 368.

In block 612, the processor 352 determines whether a descriptor read command has been received from the NIC 368. If so, the method 600 advances to block 614, in which the processor 352 performs a read operation on the descriptor corresponding to the network packet to be transmitted. In block 616, the processor 352 transmits an indication that the requested descriptor has been read and provides the information read from the descriptor to the NIC 368. In block 618, the processor 352 determines whether a data read command has been received from the NIC 368. If so, the method 600 proceeds to block 620, in which the processor performs a read operation on the data associated with network packet to be transmitted (e.g., using the read descriptor information). In block 622, the processor 352 transmits an indication to the NIC 368 that indicates the data read operation has completed and that the read data of the network packet is ready to be placed on the wire by the NIC 368.

Figure 7:
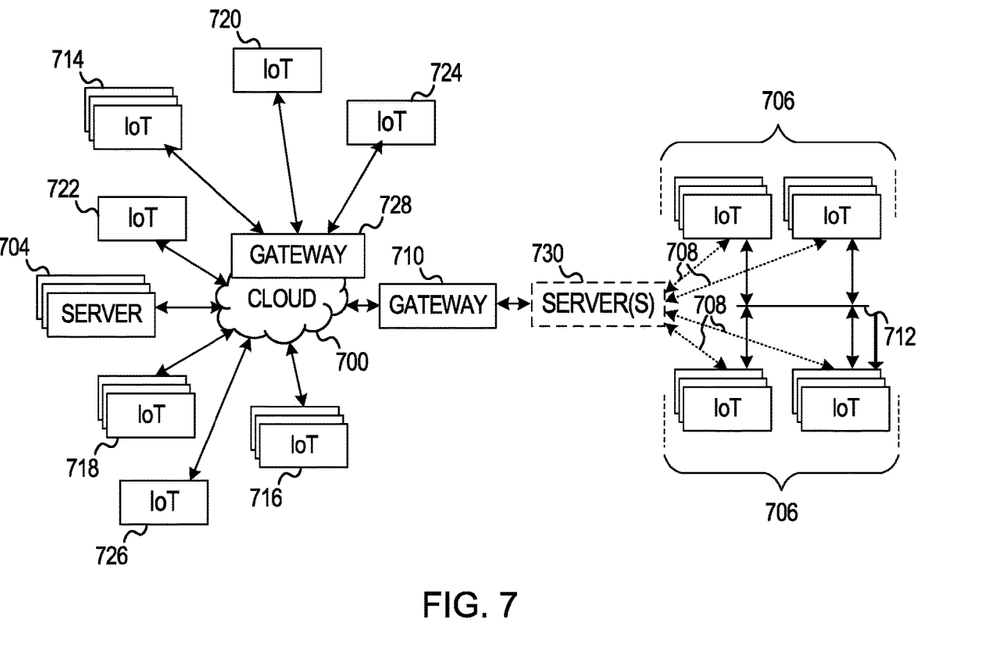
FIG. 7 is a simplified block diagram of at least one embodiment of a network illustrating communications among a number of IoT devices.

FIG. 7 illustrates a drawing of a cloud computing network, or cloud 700, in communication with a number of Internet of Things (IoT) devices (e.g., multiple IoT devices 350). The cloud 700 may represent the Internet, or may be a LAN, or a WAN, such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIGS. 2 and 3), or a combination therein. The groups of IoT devices may be deployed in various residential, commercial, and industrial settings (including private and public environments).

As can be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system (e.g., as described above with reference to FIG. 2). It should be understood that the functional units or capabilities described in this specification may have been referred to or labeled as components or modules, in order to more particularly emphasize their implementation independence. Such components may be embodied by any number of software or hardware forms.

For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

While the operations described herein have been described as being performed by an IoT device, it should be appreciated that, in alternative embodiments, the operations may be performed by another networking enabled device, such as, without limitation, a computer, a server (e.g., stand-alone, rack-mounted, blade, etc.), a sled (e.g., a compute sled, a storage sled, an accelerator sled, etc.), a network appliance (e.g., physical or virtual), a web appliance, a distributed computing system, a processor-based system, and/or a multiprocessor system.

EXAMPLES

Illustrative examples of the technologies disclosed herein are provided below. An embodiment of the technologies may include any one or more, and any combination of, the examples described below.

Example 1 includes a networked device for managing low-latency network packet transmission, the networked device comprising a network interface controller (NIC); network packet transmit mode controller circuitry to determine, subsequent to a determination that a network packet is to be transmitted from the networked device, a transmit mode of the network packet, wherein the transmit mode comprises one of a legacy network packet transmission mode or an immediate transmission mode; and a processor to write, subsequent to a determination that the transmit mode corresponds to the immediate transmission mode, data of the network packet directly to a transmit buffer register of the NIC.

Example 2 includes the subject matter of Example 1, and wherein the NIC is to transmit, subsequent to the data of the network packet having been written to the transmit buffer register of the NIC, the data to a target destination.

Example 3 includes the subject matter of any of Examples 1 and 2, and wherein to determine the transmit mode of the network packet comprises to (i) identify one or more characteristics of the network packet and (ii) compare the one or more characteristics to a one or more corresponding predetermined criterion.

Example 4 includes the subject matter of any of Examples 1-3, and wherein the one or more characteristics of the network packet include at least one of a size of the network packet, a workload type associated with the network packet, a flow associated with the network packet, a source identifying characteristic of the network packet, a destination identifying characteristic of the network packet, or an indication retrieved from a header of the network packet.

Example 5 includes the subject matter of any of Examples 1-4, and wherein to write the data of the network packet comprises to issue a single memory mapped I/O (MMIO) write command from the processor to the NIC.

Example 6 includes the subject matter of any of Examples 1-5, and wherein the processor is further to transmit, subsequent to a determination that the transmit mode corresponds to the legacy network packet transmission mode, a write request to the NIC to initiate transmission of the network packet to the NIC; read, subsequent to having received a descriptor read request from the NIC, a descriptor associated with the network packet; transmit, subsequent to having read the descriptor, a first message to the NIC that indicates the descriptor has been read; read, subsequent to having received a data read request from the NIC, data associated with the NIC; and transmit, subsequent to having read the data associated with the NIC, a second message to the NIC that indicates the data has been read and is available for transmission by the NIC.

Example 7 includes the subject matter of any of Examples 1-6, and wherein the write request comprises a memory mapped I/O (MMIO) write request and wherein each of the descriptor read request and the data read request comprises a Peripheral Component Interconnect Express (PCIe) read request.

Example 8 includes the subject matter of any of Examples 1-7, and wherein the NIC is to transmit, subsequent to the second message having been received, the data to a target destination.

Example 9 includes one or more machine-readable storage media comprising a plurality of instructions stored thereon that, in response to being executed, cause a networked device to determine, subsequent to a determination that a network packet is to be transmitted from the networked device, a transmit mode of the network packet, wherein the transmit mode comprises one of a legacy network packet transmission mode or an immediate transmission mode; and write, by a processor and subsequent to a determination that the transmit mode corresponds to the immediate transmission mode, data of the network packet directly to a transmit buffer register of a network interface controller (NIC) of the networked device.

Example 10 includes the subject matter of Example 9, and wherein the plurality of instructions further cause the NIC to transmit, subsequent to the data of the network packet having been written to the transmit buffer register of the NIC, the data to a target destination.

Example 11 includes the subject matter of any of Examples 9 and 10, and wherein to determine the transmit mode of the network packet comprises to (i) identify one or more characteristics of the network packet and (ii) compare the one or more characteristics to a one or more corresponding predetermined criterion.

Example 12 includes the subject matter of any of Examples 9-11, and wherein the one or more characteristics of the network packet include at least one of a size of the network packet, a workload type associated with the network packet, a flow associated with the network packet, a source identifying characteristic of the network packet, a destination identifying characteristic of the network packet, or an indication retrieved from a header of the network packet.

Example 13 includes the subject matter of any of Examples 9-12, and wherein to write the data of the network packet comprises to issue a single memory mapped I/O (MMIO) write command from the processor to the NIC.

Example 14 includes the subject matter of any of Examples 9-13, and wherein the plurality of instructions further cause the processor to transmit, subsequent to a determination that the transmit mode corresponds to the legacy network packet transmission mode, a write request to the NIC to initiate transmission of the network packet to the NIC; read, subsequent to having received a descriptor read request from the NIC, a descriptor associated with the network packet; transmit, subsequent to having read the descriptor, a first message to the NIC that indicates the descriptor has been read; read, subsequent to having received a data read request from the NIC, data associated with the NIC; and transmit, subsequent to having read the data associated with the NIC, a second message to the NIC that indicates the data has been read and is available for transmission by the NIC.

Example 15 includes the subject matter of any of Examples 9-14, and wherein the write request comprises a memory mapped I/O (MMIO) write request and wherein each of the descriptor read request and the data read request comprises a Peripheral Component Interconnect Express (PCIe) read request.

Example 16 includes the subject matter of any of Examples 9-15, and wherein the plurality of instructions further cause the NIC to transmit, subsequent to the second message having been received, the data to a target destination.

Example 17 includes a method for managing low-latency network packet transmission, the method device comprising determining, by a networked device and subsequent to a determination that a network packet is to be transmitted from the networked device, a transmit mode of the network packet, wherein the transmit mode comprises one of a legacy network packet transmission mode or an immediate transmission mode; and writing, by a processor and subsequent to a determination that the transmit mode corresponds to the immediate transmission mode, data of the network packet directly to a transmit buffer register of a network interface controller (NIC) of the networked device.

Example 18 includes the subject matter of Example 17, and further comprising transmitting, by the NIC and subsequent to the data of the network packet having been written to the transmit buffer register of the NIC, the data to a target destination.

Example 19 includes the subject matter of any of Examples 17 and 18, and wherein determining the transmit mode of the network packet comprises (i) identifying one or more characteristics of the network packet and (ii) comparing the one or more characteristics to a one or more corresponding predetermined criterion.

Example 20 includes the subject matter of any of Examples 17-19, and wherein identifying the one or more characteristics of the network packet comprises identifying at least one of a size of the network packet, a workload type associated with the network packet, a flow associated with the network packet, a source identifying characteristic of the network packet, a destination identifying characteristic of the network packet, and an indication retrieved from a header of the network packet.

Example 21 includes the subject matter of any of Examples 17-20, and wherein to write the data of the network packet comprises to issue a single memory mapped I/O (MMIO) write command from the processor to the NIC.

Example 22 includes the subject matter of any of Examples 17-21, and further comprising transmitting, by the processor and subsequent to a determination that the transmit mode corresponds to the legacy network packet transmission mode, a write request to the NIC to initiate transmission of the network packet to the NIC; reading, by the processor and subsequent to having received a descriptor read request from the NIC, a descriptor associated with the network packet; transmitting, by the processor and subsequent to having read the descriptor, a first message to the NIC that indicates the descriptor has been read; reading, by the processor and subsequent to having received a data read request from the NIC, data associated with the NIC; and transmitting, by the processor and subsequent to having read the data associated with the NIC, a second message to the NIC that indicates the data has been read and is available for transmission by the NIC.

Example 23 includes the subject matter of any of Examples 17-22, and wherein transmitting the write request comprises transmitting a memory mapped I/O (MMIO) write request and wherein each of the descriptor read request and the data read request comprises a Peripheral Component Interconnect Express (PCIe) read request.

Example 24 includes the subject matter of any of Examples 17-23, and further comprising transmitting, by the NIC and subsequent to the second message having been received, the data to a target destination.

The invention claimed is:

1. A device to perform low-latency network packet transmission, the device comprising:
   a network interface controller (NIC); and
   at least one processor to:
      determine, subsequent to a determination that a network packet is to be transmitted from the device, a transmit mode of the network packet, the transmit mode including at least one of a legacy network packet transmission mode or an immediate transmission mode, the transmit mode of the network packet to be determined based on at least one criterion obtained via a network communication from a controller separate from the device; and
      write, subsequent to a determination that the transmit mode corresponds to the immediate transmission mode, data of the network packet directly to a transmit buffer register that resides on the NIC, the data of the network packet to be written directly to the transmit buffer register with a single memory mapped I/O (MMIO) write command from the at least one processor to the NIC.

2. The device of claim 1, wherein the NIC is to transmit, subsequent to the write of the data of the network packet to the transmit buffer register that resides on the NIC, the data to a target destination.

3. The device of claim 1, wherein to determine the transmit mode of the network packet, the at least one processor is to (i) identify one or more characteristics of the network packet and (ii) compare the one or more characteristics to the at least one criterion.

4. The device of claim 3, wherein the one or more characteristics of the network packet include at least one of a size of the network packet, a workload type associated with the network packet, a flow associated with the network packet, a source identifying characteristic of the network packet, a destination identifying characteristic of the network packet, or an indication retrieved from a header of the network packet.

5. The device of claim 1, wherein, subsequent to a determination that the transmit mode corresponds to the legacy network packet transmission mode, the at least one processor is further to:
   transmit a write request to the NIC to initiate transmission of the network packet to the NIC;
   read, subsequent to receipt of a descriptor read request from the NIC, a descriptor associated with the network packet;
   transmit, subsequent to the read of the descriptor, a first message to the NIC to indicate the descriptor has been read;
   read, subsequent to receipt of a data read request from the NIC, data associated with the NIC; and
   transmit, subsequent to the read of the data associated with the NIC, a second message to the NIC to indicate the data has been read and is available for transmission by the NIC.

6. The device of claim 5, wherein the write request corresponds to a memory mapped I/O (MMIO) write request, the descriptor read request corresponds to a first Peripheral Component Interconnect Express (PCIe) read request, and the data read request corresponds to a second PCIe read request.

7. The device of claim 5, wherein the NIC is to transmit, subsequent to receipt of the second message, the data to a target destination.

8. At least one machine-readable storage device comprising machine-readable instructions that, when executed, cause one or more processors of a compute device to at least:
   determine, subsequent to a determination that a network packet is to be transmitted from the compute device, a transmit mode of the network packet, the transmit mode including at least one of a legacy network packet transmission mode or an immediate transmission mode, the transmit mode of the network packet to be determined based on at least one criterion obtained via a network communication from a controller separate from the compute device; and
   write, subsequent to a determination that the transmit mode corresponds to the immediate transmission mode, data of the network packet directly to a transmit buffer register that resides on a network interface controller (NIC) of the compute device, the data of the network packet to be written directly to the transmit buffer register with a single memory mapped I/O (MMIO) write command to the MC.

9. The at least one machine-readable storage device of claim 8, wherein the instructions further cause the NIC to transmit, subsequent to the write of the data of the network packet to the transmit buffer register that resides on the NIC, the data to a target destination.

10. The at least one machine-readable storage device of claim 8, wherein to determine the transmit mode of the network packet, the instructions cause the one or more processors to (i) identify one or more characteristics of the network packet and (ii) compare the one or more characteristics to the at least one criterion.

11. The at least one machine-readable storage device of claim 10, wherein the one or more characteristics of the network packet include at least one of a size of the network packet, a workload type associated with the network packet, a flow associated with the network packet, a source identifying characteristic of the network packet, a destination identifying characteristic of the network packet, or an indication retrieved from a header of the network packet.

12. The at least one machine-readable storage device of claim 8, wherein, subsequent to a determination that the transmit mode corresponds to the legacy network packet transmission mode, the instructions cause the one or more processors to:
  transmit a write request to the NIC to initiate transmission of the network packet to the NIC;
  read, subsequent to receipt of a descriptor read request from the NIC, a descriptor associated with the network packet;
  transmit, subsequent to the read of the descriptor, a first message to the NIC to indicate the descriptor has been read;
  read, subsequent to receipt of a data read request from the NIC, data associated with the NIC; and
  transmit, subsequent to the read of the data associated with the NIC, a second message to the NIC to indicate the data has been read and is available for transmission by the NIC.

13. The at least one machine-readable storage device of claim 12, wherein the write request corresponds to a memory mapped I/O (MMIO) write request, the descriptor read request corresponds to a first Peripheral Component Interconnect Express (PCIe) read request, and the data read request corresponds to a second PCIe read request.

14. The at least one machine-readable storage device of claim 12, wherein the instructions further cause the NIC to transmit, subsequent to receipt of the second message, the data to a target destination.

15. A method to perform low-latency network packet transmission, the method comprising:
  determining, by executing an instruction with at least one processor of a device, and subsequent to a determination that a network packet is to be transmitted from the device, a transmit mode of the network packet, the transmit mode including at least one of a legacy network packet transmission mode or an immediate transmission mode, the determining of the transmit mode of the network packet being based on at least one criterion obtained via a network communication from a controller separate from the device; and
  writing, by executing an instruction with the at least one processor, and subsequent to a determination that the transmit mode corresponds to the immediate transmission mode, data of the network packet directly to a transmit buffer register residing on a network interface controller (NIC) of the device, the data of the network packet being written directly to the transmit buffer register with a single memory mapped I/O (MMIO) write command to the NIC.

16. The method of claim 15, further including transmitting, by the NIC and subsequent to the writing of the data of the network packet to the transmit buffer register residing on the NIC, the data to a target destination.

17. The method of claim 15, wherein the determining of the transmit mode of the network packet includes (i) identifying one or more characteristics of the network packet and (ii) comparing the one or more characteristics to the at least one criterion.

18. The method of claim 17, wherein the identifying of the one or more characteristics of the network packet includes identifying at least one of a size of the network packet, a workload type associated with the network packet, a flow associated with the network packet, a source identifying characteristic of the network packet, a destination identifying characteristic of the network packet, and an indication retrieved from a header of the network packet.

19. The method of claim 15, further including, subsequent to a determination that the transmit mode corresponds to the legacy network packet transmission mode:
  transmitting a write request to the NIC to initiate transmission of the network packet to the NIC;
  reading, subsequent to having received a descriptor read request from the NIC, a descriptor associated with the network packet;
  transmitting, subsequent to the reading of the descriptor, a first message to the NIC that indicates the descriptor has been read;
  reading, subsequent to having received a data read request from the NIC, data associated with the NIC; and
  transmitting, subsequent to the reading of the data associated with the NIC, a second message to the NIC that indicates the data has been read and is available for transmission by the NIC.

20. The method of claim 19, wherein the transmitting of the write request includes transmitting a memory mapped I/O (MMIO) write request, the descriptor read request corresponds to a first Peripheral Component Interconnect Express (PCIe) read request, and the data read request corresponds to a second PCIe read request.

21. The method of claim 19, further including transmitting, by the NIC and subsequent to the second message having been received, the data to a target destination.

* * * * *